(12) United States Patent
Matusik et al.

(10) Patent No.: US 11,518,109 B2
(45) Date of Patent: Dec. 6, 2022

(54) THERMAL MANAGEMENT FOR ADDITIVE FABRICATION

(71) Applicant: Inkbit, LLC, Medford, MA (US)

(72) Inventors: Wojciech Matusik, Lexington, MA (US); Javier Ramos, Brookline, MA (US); Aaron Weber, Arlington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/085,376

(22) Filed: Oct. 30, 2020

(65) Prior Publication Data

US 2022/0134672 A1 May 5, 2022

(51) Int. Cl.
| | |
|---|---|
| *B29C 64/393* | (2017.01) |
| *B33Y 10/00* | (2015.01) |
| *B33Y 30/00* | (2015.01) |
| *B33Y 50/02* | (2015.01) |
| *B29C 64/112* | (2017.01) |
| *B29C 64/20* | (2017.01) |

(52) U.S. Cl.
CPC .......... *B29C 64/393* (2017.08); *B29C 64/112* (2017.08); *B29C 64/20* (2017.08); *B33Y 10/00* (2014.12); *B33Y 30/00* (2014.12); *B33Y 50/02* (2014.12)

(58) Field of Classification Search
CPC ................. B29C 64/393; B29C 64/112; B29C 64/386–393; B33Y 10/00; B33Y 30/00; B33Y 50/00–02
See application file for complete search history.

(56) References Cited

U.S. PATENT DOCUMENTS

| | | | |
|---|---|---|---|
| 5,833,914 A | * 11/1998 | Kawaguchi | ........... B29C 64/106 |
| | | | 264/400 |
| 10,011,071 B2 | 7/2018 | Batchelder | |
| 10,252,466 B2 | 4/2019 | Ramos et al. | |
| 10,456,984 B2 | 10/2019 | Matusik et al. | |
| 10,769,324 B2 | 9/2020 | Matusik et al. | |
| 2001/0003004 A1 | * 6/2001 | Leyden | ................... B29C 41/36 |
| | | | 425/375 |

(Continued)

FOREIGN PATENT DOCUMENTS

WO  2020/068075 A1  4/2020

OTHER PUBLICATIONS

International Search Report and Written Opinion, PCT Application No. PCT/US2021/056237, dated Jan. 13, 2022 (18 pages).

*Primary Examiner* — Matthew J Daniels
*Assistant Examiner* — Andrew L Swanson
(74) *Attorney, Agent, or Firm* — Occhiuti & Rohlicek LLP (57) ABSTRACT

A method for managing the temperature of three-dimensional object during additive manufacturing includes depositing material on a partial fabrication of the three-dimensional object, determining thermal properties of the three-dimensional object after depositing the material, and controlling cooling of the object according to said thermal properties. In some examples, the determining of the thermal properties includes determining a temperature variation across the object and controlling position-dependent cooling of the object in a feedback arrangement. Resulting uniform temperature of the object under fabrication can improve dimensional accuracy and material properties of the object.

10 Claims, 3 Drawing Sheets

(56) References Cited

U.S. PATENT DOCUMENTS

| | | |
|---|---|---|
| 2007/0241482 A1 | 10/2007 | Giller et al. |
| 2008/0124475 A1 | 5/2008 | Kritchman |
| 2015/0190966 A1 | 7/2015 | Griszbacher et al. |
| 2016/0236414 A1* | 8/2016 | Reese .................... B33Y 50/02 |
| 2016/0325496 A1* | 11/2016 | De Pena ................. B29C 64/40 |
| 2016/0332384 A1 | 11/2016 | De Pena et al. |
| 2017/0021455 A1 | 1/2017 | Dallarosa et al. |
| 2017/0072626 A1 | 3/2017 | McConville et al. |
| 2017/0120337 A1 | 5/2017 | Kanko et al. |
| 2017/0355147 A1 | 12/2017 | Buller et al. |
| 2017/0368741 A1* | 12/2017 | Mandel ................. B29C 64/112 |
| 2019/0322031 A1 | 10/2019 | Kritchman |
| 2019/0329322 A1 | 10/2019 | Preston et al. |
| 2019/0358907 A1 | 11/2019 | Starkey et al. |
| 2020/0086552 A1* | 3/2020 | Yarka .................... B29C 64/118 |
| 2020/0124403 A1 | 4/2020 | Weber et al. |
| 2020/0156308 A1 | 5/2020 | Ramos et al. |
| 2020/0215761 A1 | 7/2020 | Chen et al. |
| 2020/0223147 A1 | 7/2020 | Chen et al. |
| 2020/0298489 A1 | 9/2020 | Shawi et al. |
| 2020/0338832 A1 | 10/2020 | Wang et al. |
| 2021/0178658 A1 | 6/2021 | Hartman et al. |

* cited by examiner

THERMAL MANAGEMENT FOR ADDITIVE FABRICATION

BACKGROUND OF THE INVENTION

This application relates to thermal management during additive fabrication.

Additive manufacturing refers to fabricating an object by selective addition of material. One approach to additive manufacturing works by "slicing" a digital model of an object into layers. A fabrication apparatus uses data representing the layers of the model to deposit physical layers of material, starting with a bottom layer and ending with a top layer. Additive manufacturing is rapidly gaining popularity in a variety of markets including automotive, aerospace, medical devices, pharmaceuticals, and industrial tooling.

One type of additive fabrication apparatus includes a jetting printhead mounted on a gantry. The printhead deposits droplets of liquid printable resins at different locations within a build volume to fabricate an object that is supported by a build platform. In some cases, the printhead moves relative to the build platform. In other cases, the build platform moves relative to the printhead. An apparatus of this type is sometimes called a "3D printer."

One class of materials used for additive manufacturing are photo-curable resins (e.g., UV or near-UV curable resins). These liquid materials are polymerized/solidified using light. Typically, a light source moves relative to the build platform to cause or initiate polymerization of the resin after each layer. The polymerization process is usually exothermic. Significant amount of heat energy can be released to the surrounding spatial neighborhood during this process. This exothermic energy might cause temperature variations throughout the build volume. This, in turn, can lead to many undesired effects such as deformation of printed parts, residual stresses in printed materials, or melting of the support material (e.g., a wax).

It is possible to enclose the fabrication apparatus in an enclosure within which a constant temperature is maintained, for example, being a few degrees higher than the temperature outside of enclosure. But such an approach can only generally cool the object being fabricated.

SUMMARY OF THE INVENTION

In general, temperature variation within the object being printed can have negative effects on the results of the additive manufacturing process. For example, printed objects might deform during and after the printing process (e.g., as a result of non-uniform cooling), resulting in a poor dimensional accuracy. Furthermore, mechanical properties of printed objects can be lower, for example, due to the residual stresses. Temperature buildup in the print volume might also lead to melting of the build or support materials that have low melting temperature (e.g., waxes used for support material). Overall, it is desired that the whole object being printed has a fixed temperature that does not significantly change throughout the manufacturing process. Ensuring minimal temperature variation is challenging due to the exothermic nature of the photo polymerization process.

A cooling fan may be introduced in the fabrication apparatus to aid in the cooling of material as it is curing. However, material that is still undergoing the curing process may not be mechanically stable enough to receive an uncontrolled high-velocity airflow, thereby potentially distorting the object under fabrication. Furthermore, when using jetted material deposition, air currents within the apparatus may make it difficult to predictably control where material droplets will be deposited, thereby introducing fabrication error.

Very generally, maintaining a consistent (i.e., repeatable) fabrication process, including the cooling process of the build material, allows for control of the process to achieve precise fabrication tolerances and high material quality. One or more embodiments described in this document make use of controlling cooling air flow across the surface of the object to cool the object (i.e., transfer heat from the object). This controlling of heat transfer may include controlling a flow rate and/or temperature of the cooling air, as well as positional control of the airflow to yield different flow characteristics across different parts of the surface, thereby controlling the heat flow from the different parts of the surface of the object. For example, a central area of the object may be hotter than a peripheral part of the object, and the control of the air flow and resulting heat transfer may be used to achieve a more uniform temperature across the entire surface of the object.

In one or more embodiments, the control of the temperature of the object may use a feedback approach including monitoring of the temperature of an object under fabrication. For example, variation of temperature across the surface of the object is monitored (and potentially the temperature in the bulk of the object monitored or inferred) and then the air flow is controlled based on the measured temperature and the desired cooling characteristics.

In some embodiments, a suitable instrument for monitoring the temperature of the object being fabricated is a thermal sensor (e.g., thermal/IR camera). This thermal sensing unit can be coupled with an active cooling mechanism that selectively cools the print volume such that the temperature variations are minimized. A feedback loop system takes an input from a thermal sensor and instructs the cooling system to selectively cool the build volume according to a desired objective.

Various temperature-based objectives may be desired. In some situations, the objective may be to keep the temperature constant across the surface of the object, or constant through the entire volume of the object. In some situations, the objective may be to keep the temperature as close as possible to a desired temperature (which may be constant, or may vary across the surface or throughout the object on design considerations, such a desired cooling time and spatial profiles), within a tolerance range, or not to exceed a threshold temperature. In some situations, the objective may be to keep the temperature of the object below a limit temperature. In some situations, the objective may be to keep the average temperature at a target value or keep it from exceeding a threshold value. Yet other objectives may be desired, for example, based on material properties being used and the result of spatial (e.g., surface and/or volumetric) and/or temporal cooling profiles (e.g., time and spatially varying temperature targets).

An apparatus for carrying out additive manufacturing for manufacturing an object can include a printhead having a nozzle that ejects printable resin towards the object, an actuator, a controller that controls operation of the printhead and the actuator, and a thermal measurement unit that provides, to the controller, a feedback signal indicative of spatial thermal distribution of an exposed surface of the object/build volume.

The thermal measurement unit captures information about the spatial thermal distribution of the build volume. Based on this information the cooling unit(s) that spatially change the thermal distribution on the build surface.

In some embodiment the thermal measurement unit is a thermal area camera that can capture the temperature of the build volume or part of the volume. The camera can be positioned to capture the image of the top surface of the build volume from above. It also can be positioned to capture the images from the sides. Multiple thermal/IR cameras can be also used. Alternatively, the camera can be moved with respect to the build platform to capture many areas.

In other embodiments the thermal measurement unit is a thermal linear camera or individual thermal sensors that are moved with respect to the build volume. These sensors use multiple measurements at different locations with respect to the build plate to capture thermal images of the build volume.

In some embodiments, a curing unit is used in the photopolymerization process of the resin material. The curing unit moves with respect to the build volume and polymerizes the deposited resin material. The curing unit can be a mercury-arc light source or an LED-based light source.

Photopolymerization processes are exothermic reaction that locally release heat energy. Therefore, the top area in the build volume generally has a higher temperature compared to the rest of the build volume. This may not be desirable because it can lead to temperature gradients that cause part deformation, residual stresses, incorrect dimensions/non-uniform material shrinkage. In general, it is preferable to keep the temperature over the whole build volume as uniform as possible.

The controller receives data from the thermal measurement unit and directs a cooling procedure, generally to achieve a desired temperature objective. For example, the cooling procedure can be as simple as slowing down the printing process to make sure that the temperature throughout the volume does not deviate from the target temperature. In another embodiment, an active cooling system selectively cools down the area of the volume that have the temperature above the target value. The cooling system can consist of the units that direct a colder air at the surface. It can also consist of an array of fans that blow directed air at the surface. In some embodiments, the cooling unit can move over the print volume area. The amount of cooling applied might depend on how much the temperature in a given spatial neighborhood exceeds the desired target temperature.

In another aspect, in general, an apparatus for additive manufacturing of an object includes a material deposition unit (110) configured to incrementally add material to form a three-dimensional object (102) in an additive manufacturing process and a thermal management unit (120). The thermal management unit includes a controllable air distribution system (114,115) configurable to direct airflow to cause change in the thermal properties of object during the additive manufacturing process, and a controller (116), coupled to the controllable air distribution system, configured to receive measured or predicted thermal properties of the three-dimensional object during fabrication, and provide a control signal to the controllable air distribution system as output.

Aspects can include one or more of the following features.

The thermal management (120) further includes a thermal measuring device (112) configured to measure thermal properties associated with the adding of the material to the object during the additive manufacturing process The controller (116) is coupled to the thermal measuring device, configured to receive the thermal properties from the thermal processing device as input, and configured to control the air distribution system according to the measured thermal properties.

The thermal measuring device (112) comprises one or more thermal imaging devices (e.g., infrared cameras).

The images produced by each of the thermal imaging devices in the thermal measuring device (112) can be combined to form a single infrared image representation of the three-dimensional object (102).

The controllable air distribution system comprises a plurality of fans (114).

Each fan in the plurality of fans is configured to blow substantially in the direction of the 3-dimensional fabricated object (102).

Each fan in the plurality of fans may have variable speed relative to one another.

Each fan in the plurality of fans is positionally controllable such that different areas under the blower are cooled to different extents based on the thermal imaging.

The variable speed of each fan in the plurality of fans is controlled by the controller (116).

The controllable air distribution system (114) comprises an air flow direction structure comprising a plurality of air flow direction channels (216, 217).

At least one of the air flow direction channels in the air flow direction structure include an intake channel (217) and an output channel (216).

The intake port and the output port art configure to cause airflow from the output port into the intake port in operation, and the output channel (216) directs air toward the object (102).

In another aspect, in general, a method for managing the temperature of three-dimensional object (102) during additive manufacturing includes determining thermal properties of the three-dimensional object after depositing material on a partial fabrication of the three-dimensional object and controlling cooling of the object according to said thermal properties.

Aspects can include one or more of the following features.

The depositing, measuring, and controlling steps are repeated to incrementally form the three-dimensional object.

The controlling of the cooling is performed to achieve desired thermal properties of the object.

Depositing the material comprises depositing a material in a liquid form and causing the material to cure The curing of the material comprises an exothermal process.

Depositing the material comprises depositing a material in a liquid form at an elevated temperature such that the material solidifies by a phase change as a result of cooling of the material.

Determining the thermal properties of the three-dimensional object comprises determining temperature as a function of location.

Determining the material comprises predicting (e.g., inferring) the thermal properties.

Determining the material comprises measuring the thermal properties using a thermal sensor.

Other aspects, features, and advantages, are apparent from Drawings and Detailed Description, and from the Claims.

DETAILED DESCRIPTION

1 Additive Manufacturing Apparatus

Figure 1:
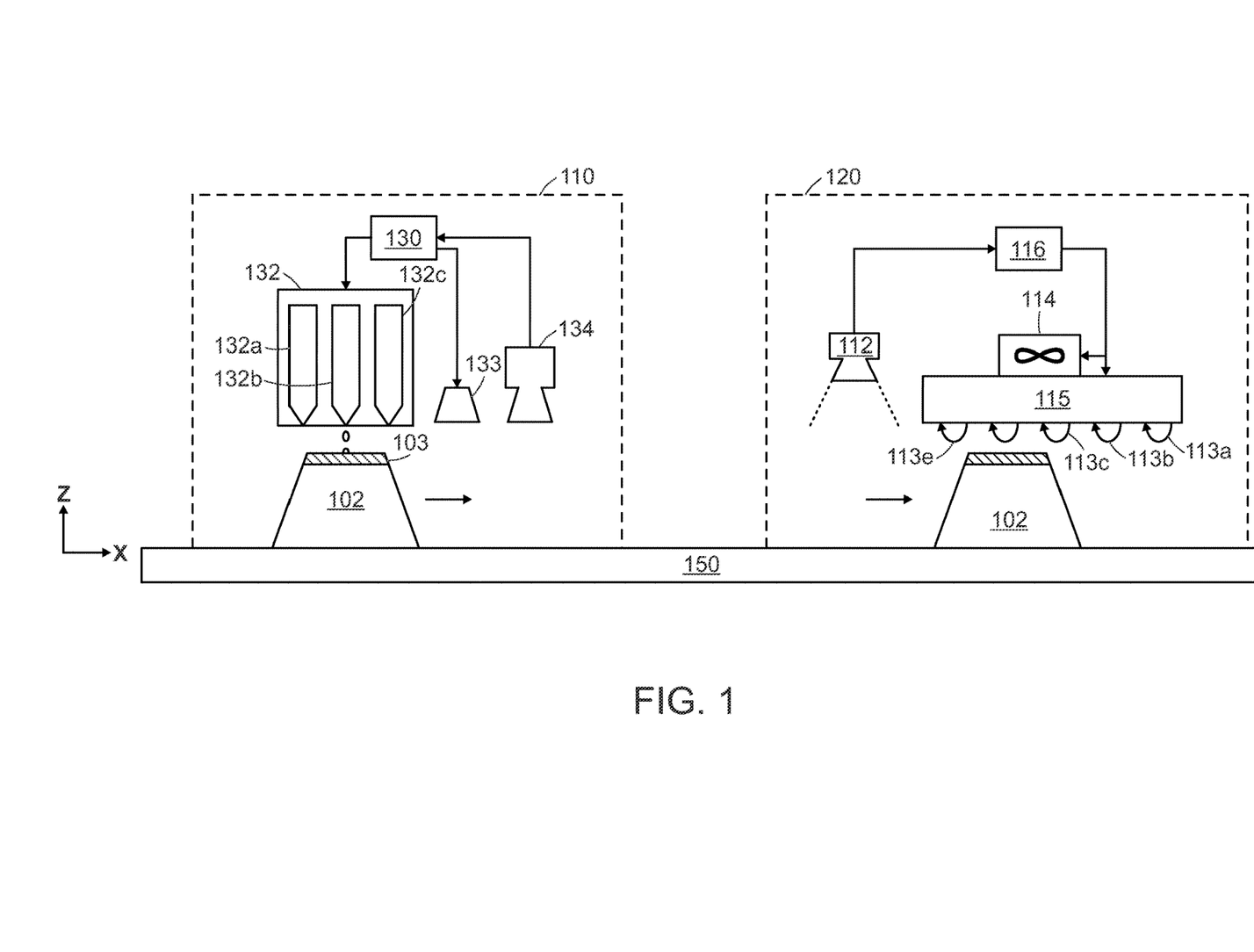
FIG. 1 is a schematic diagram of an additive fabrication apparatus with a cooling unit.

Referring to FIG. 1, a representative additive manufacturing apparatus 100 includes a material fabrication subsystem 110 and a thermal management subsystem 120. Very generally, the additive manufacturing apparatus 100 performs an additive manufacturing process by passing an object 102 back and forth underneath the material fabrication subsystem 110, which includes jet subsystem 132 that is used to deposit material layers 103 of material on the object 102 under fabrication. As described in further detail below, curing of the deposited material can be exothermic, and to control the temperature of the object under fabrication, the object also moves back and forth under the thermal management subsystem 120, which enhances the cooling characteristics of the object.

The material layer 103 is deposited from the jet subsystem 132 by way of several printheads 132a, which dispense material in liquid form. As seen specifically in FIG. 1, the jet subsystem 132 includes two or more printheads 132a-c. Some materials solidify by cooling after being deposited. For example, a wax-based support material may be dispensed at an elevated temperature, and after being deposited solidifies by cooling. Other materials, for example, epoxy-based build materials may be dispensed in liquid form and solidify after curing. For some such materials, curing is initiated by light excitation in a photo polymerization process, for example with wavelength in the 100 nm-450 nm range or in the Ultraviolet (UV) range. In the apparatus 100, as the object 102 passes under the material fabrication subsystem 110, it passes a lamp 133 that initiates the curing. The lamp can be broadband, or it can have a narrow wavelength range. Some examples of the illumination sources include mercury arc lamps or light emitting diodes. Other modes of initiation of curing can be used for other materials, for example, by excitation with radio-frequency excitation, or by depositing mixtures of compounds (e.g., from separate jets, or mixed shortly before jetting) that together react to cure the material.

The object also passes under a scanner (e.g., a camera) 134, which measures dimensional and/or material properties of the object (e.g., material identification, proportions of materials, degree of curing, etc.), and these measurements are passed to a controller 130, which implements a feedback control of the jet subsystem 132. Examples of such feedback approaches are found in U.S. Pat. Nos. 10,252,466, and 10,456,984, which are incorporated herein by reference. During the course of an object's manufacture, a transport system 150 (also referred to as an actuator) causes motion of the object relative to the print head. In the illustrated embodiment, the transport system translates the object in a vertical direction z and in two horizontal directions x, y. The two horizontal directions define a "transverse plane." Not illustrated in FIG. 1 are details of the transport system 150, which implements motion in the x direction (i.e., back and forth under the fabrication subsystem 110), in the y direction allowing printing of multiple "stripes" of material across a surface in a raster pattern, and in the z direction to maintain a desired (e.g., fixed) distance between the surface of the object being fabricated and the jet subsystem 132.

2 Thermal Management

As introduced above, curing of certain materials is an exothermic process that releases thermal energy to the surrounding area. For example, curing the top layer of the printed object and progressively building the object layer by layer has an effect of introducing a temperature variation throughout the volume of the object. For example, without other control, the bottom part of the printed object would have a lower temperature than the top part. Due to different geometries of printed objects, temperature can also vary with respect to the x and y coordinates, for example, with lower temperatures near the periphery of the object in the x-y plane than near the center of the object.

Referring to FIG. 1, as introduced above, the object 102 passes back and forth under the thermal management subsystem 120. The mechanism to facilitate heat removal from the print is high-speed air concentrated over the top surface of the build. The air flow is preferably oriented in a way to minimize interference with the print process. High-speed air near the jetting area decreases the landing accuracy of the jetted droplets. In addition to considering the orientation of the cooling air flows, the uniformity of the air flow is such that hot or cool spots are not induced. To achieve this, a clear outlet for air that has been warmed by the process is defined in the cooling assembly. In general, the cooling process performed by the thermal management subsystem 120 entails passing the object 102 under one or more air flows 113a-e, which pass cooling air across the surface of the object. Various embodiments of the thermal management unit implement one or more of the following features:
- localization of one or more distinct air flows disposed in the x dimension or the x-y plane;
- control of the cooling effect of the air flow(s), for example, by varying temperature and/or flow rate; and
- feedback control of the cooling effect based on thermal imaging of the object.

Together, these features enable accurate control of the cooling process, for example, to maintain a controlled temperature profile on the surface and/or throughout the bulk of the object being fabricated, for instance a uniform temperature profile or a planned temperature gradient.

Note that although much of this description focuses on cooling of exothermic curing (e.g., polymerization) processes, the approaches are also applicable to cooling for other reasons, such as cooling waxes that are jetted in liquid form and solidified by cooling (e.g., by a phase change of the material).

3 Air Flow Localization

The thermal management unit 120 shown in FIG. 1 includes one or more fans 114, and a distribution assembly 115. Generally, the fans 114 cause air to enter the distribution assembly 115 and retrieve air from the distribution assembly. The distribution assembly is physically configured to emit flows 113a-e from the bottom of the assembly, and to substantially retrieve those flows, thereby forming a substantially closed loop flow driven by the fans 114. Because the flows 113a-e are in the open, the flow is not entirely a closed loop because at least some of the air emitted from the distribution assembly is not retrieved, and other air not emitted from the assembly enters the assembly. However, by its mechanical design, a large fraction of the emitted air is retrieved.

Figure 2:
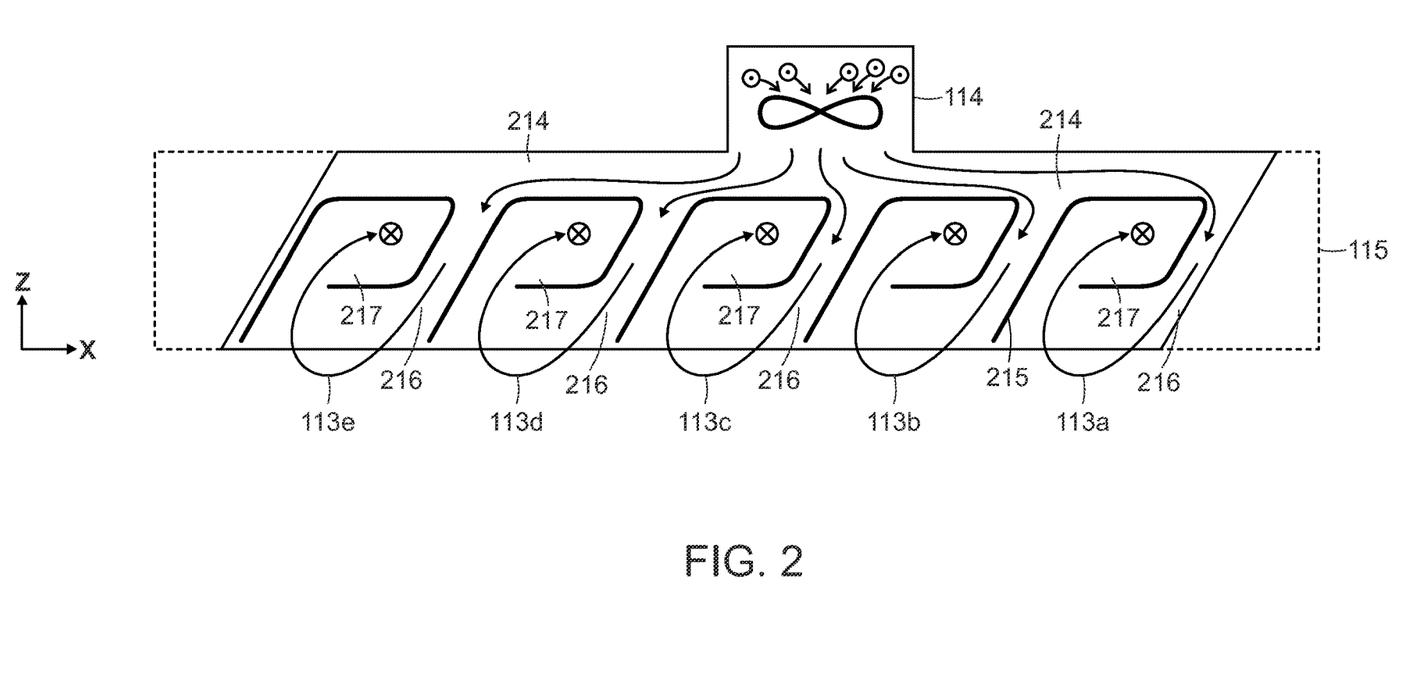
FIG. 2 is a cross-sectional side view of a thermal management unit.

Referring to FIG. 2, a cross section of the distribution assembly 115 and an attached fan 114 shows an arrangement of channels that implement the substantially closed-loop flow. The assembly 115 includes one or more lateral members 215 extending in the y direction. The members form a series of channels 216 through which the air is emitted under pressure caused by the fan 114. In some embodiments, the channels are very small, for example, in the order of microns creating micro-jets, while in other embodiments, the channels are in the centimeter range. The airflow passes from the fan 114, through a plenum 214, and then through the series of channels 216. As illustrated in FIG. 2, these channels are angled rather than being directed directly downward (i.e., in the −z direction) causing the flows to impinge on the object being cooled at an angle, thereby reducing mechanical interaction with the curing material.

Each of the members 215 forms a lateral (in the y direction) channel 217 through which the emitted air is returned to the fan. The channel 217 has a lateral slot such that the air emitted from each channel 216 may be recovered to through the slot in the corresponding channel 217. In this way, each of the flows is spatially localized, in this embodiment, being localized in the x direction to being located under one of the members 215.

Figure 3:
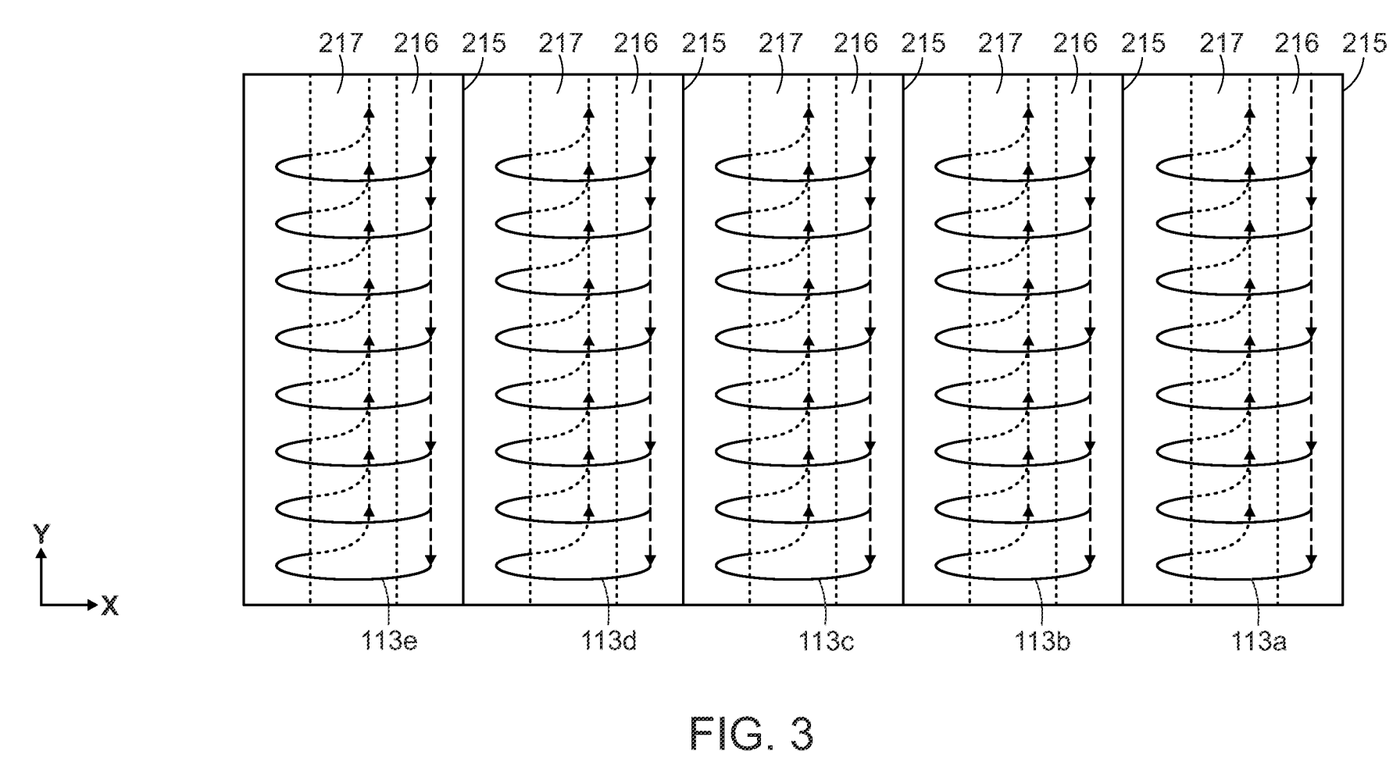
FIG. 3 is a bottom view of the thermal management unit.

Referring to FIG. 3, a bottom view of the distribution assembly illustrated the flows 115*a-e*. In this embodiment, the flows essentially form "sheets" of airflow that extend in the y direction across the width of the distribution assembly.

The arrangement illustrated in FIGS. 2-3 is only one example of a configuration of the distribution assembly. For example, the separate flows may be arranged along the y direction (i.e., rotating the assembly in the x-y plane by 90 degrees relative to FIG. 3), and the assembly may be relatively narrow in the x direction, essentially making a 1D array with control of the cooling across the y dimension. Yet other arrangements may make use of multiple fans, for example, using some fans that emit air flow from the distribution assembly and some recovering air flow into the assembly (e.g., with the fans arranged in a controllable grid).

4 Cooling Control

In the embodiment of the thermal management unit 120 illustrated in FIGS. 2-3, control of the cooling process to achieve a desired objective may be accomplished by varying the speed of the fan 114, such that with a higher air flow rate, a higher rate of heat transfer may be achieved.

Various temperature-based objectives may be used in various situations and using various embodiments. In some situations, the objective may be to keep the temperature constant across the surface of the object, or constant through the entire volume of the object. In some situations, the objective may be to keep the temperature as close as possible to a desired temperature (which may be constant, or may vary across the surface or throughout the object on design considerations, such a desired cooling time and spatial profiles), within a tolerance range, or not to exceed a threshold temperature. In some situations, the objective may be to keep the temperature of the object below a limit temperature. In some situations, the objective may be to keep the average temperature at a target value or keep it from exceeding a threshold value. Yet other objectives may be desired, for example, based on material properties being used and the result of spatial (e.g., surface and/or volumetric) and/or temporal cooling profiles (e.g., time and spatially varying temperature targets).

In addition to varying the speed of one fan 114, other approaches to control may be incorporated into alternative embodiments of the unit, including use of one or more of the following:

multiple adjustable fans, each driving airflow to a distinct x-y region of the distribution assembly;

controllable vanes or valves to modulate the airflow, for example, through individual channels 216, optionally segmenting the channels 216 in the y direction to effectively form an x-y grid of airflows emitted from the bottom of the distribution assembly—for example, the angle of the members adjacent to the channels 216 may have a controllable angle, such that the controlled angle affects the volume of airflow and/or the direction of airflow, or as another example, an x-y grid of valves is disposed at the upper end of the channels 216 for modulating the airflows; and adjustable cooling of air during circulation, for example, by passing the air over cooling (or heating) fins or thermoelectric (e.g., Peltier effect) pads within the unit, either for the airflow as a whole, or with separate controlled thermoelectric pads associated with different of the channels permitting spatial variation (i.e., localized control) of the temperature of the emitted air.

In such controllable embodiments, the combination of the fan(s) 114 and the distribution assembly 115 are collectively referred to as a selective cooling subsystem.

For example, a cooling unit might comprise of a 1D array cooling elements (e.g., fans or air channels) that are individually controlled and spanning the y-axis of the printer. As the objects being printed move below this 1D array of cooling elements in the x-direction, each x-y location for objects being printed can be selectively cooled. In another embodiment, a 2D array of cooling elements can be used. In another embodiment a single cooling element is used with its own motion system (e.g., moving or oscillating in the y direction) to move to desired location over the build volume.

In some controlled embodiments, the thermal management unit is controlled in an "open loop" configuration. For example, the unit is controlled to cause flows to emit from the unit when those flows are expected to impinge on the object because the object is positioned below the unit and avoiding emitting air flows when there is no object under the unit. One advantage of such control is that air flows that might disturb the jetting process may be avoided.

In some more complex open loop controlled implementations, required cooling is predicted from based on the fabrication process (e.g., dimensions, materials, timing, etc.) and the unit is controlled according to the required cooling, for example varying the cooling as a function of x-y location on the object by varying the cooling as a function of x-y location under the distribution assembly (e.g., more cooling where higher temperatures are predicted) and the timing of the movement of the object under the assembly.

5 Cooling Feedback Control

Referring back to FIG. 1, in some embodiments, the thermal management subsystem 120 also includes a thermal measurement unit 112 that acquires data on the spatial distribution of the temperature over the object's top surface or volume. There are many possible embodiments for the thermal measurement unit 112.

In one embodiment the thermal measurement unit is an infrared (IR) camera (or a set of cameras whose combined field of view span the whole required imaging area). In one embodiment, the IR camera is mounted between the end of the motion travel of the object under the fabrication subsystem 110 and the air distribution assembly 115. For example, object being printed comes to a stop with respect to the thermal imaging unit, which then acquires a complete image of the object. In another embodiment, imaging the object may be performed while the object is moving with respect to the camera although there might be some amount of the motion blur. Thermal images or printed objects typically do not have large spatial variations due to the heat diffusion process and therefor such motion blur may not be significant. In some embodiments, a rolling shutter in thermal imagers can be also employed to minimize the amount of the motion blur. In this case the columns of the imager are aligned with the direction of the motion (e.g., the x-axis).

In another embodiment, an IR line camera (or a set of IR line cameras) can be used. The camera moves relative to the object (e.g., the camera can be fixed with respect to the printheads) and acquires linear IR images as the object moves below the camera. A collection of these linear IR images can be combined to form one 2D image. It is beneficial for the camera to be synchronized with the motion system (e.g., triggering the image capture using encoder signal from the motion stage).

In another embodiment a single thermal sensor can be used to yield a low-resolution thermal image. A 1D array or single thermal sensors can be employed. This 1D array works in a similar manner as an IR line camera.

Thermal measurement units can be also fixed with respect to the object (e.g., moving with the moving object) to provide continuous measurement of the parts being printed.

In some embodiments, the object being fabricated can also be imaged from the sides. For example, such side imaging may provide more information from which the temperature distribution within the object may be inferred.

As described below, the thermal imaging of the object may be used to control the thermal management unit 120. Other uses of the imaging can additionally or alternatively be used to control the overall printing process. For example, a controller can stop (or temporarily stop between printing of layers) the printing process if the temperature of the object being printed exceeds a given value. The printing process can be also slowed down if the temperature of object being printed exceeds a given threshold value. This temperature can be calculated as an average, median, a maximum value, or some percentile value (e.g., top 90% value). Alternatively, a delay time between layers or motion speed can also be a function of this temperature. Alternatively, layer thickness (or amount of deposited material) can be also adapted according to the recorded temperature (e.g., reducing the thickness of layers to reduce the temperature). Thermal imaging data can be also stored with each printed part as a print record (e.g., for quality assurance purposes).

In feedback control of the thermal management unit (i.e., to promote more accurate manufacturing), a controller 116 relies on feedback from the thermal imaging unit 112 to control the operation of the selective cooling system 114-115. Such a controller relies at least in part on information on the thermal measurement data of the object's surface.

In one embodiment, the controller obtains thermal measurement data. These data are translated to temperature values. The temperature data $T(x,y)$ are mapped onto the surface of the objects being printed. For example, a temperature image $T(x,y)$ is projected onto a 3D surface of the object (e.g., the top plane) using a projective transform. An approximate 3D surface can be also used (e.g., a top plane of the objects being printed) during this mapping process. A 3D data from an in-the-printer 3d scanner or a virtual model data can be also used to obtain the current geometry on the build plate. Alternatively, this geometry can be approximated as a plane.

The controller may use measurements from multiple thermal scans, for example, from multiple previous layers to control the cooling process. For example, the multiple scans can be used to infer the interior temperature of the object (e.g., based on a dynamical cooling model). Another use of multiple thermal scans is to provide a more accurate estimate of the surface temperature, for example, by averaging the scans from a sliding window of previous scans (e.g., after depositing of previous material layers).

The 3D build volume of the object is divided into the cooling zones. Each cooling zone is assigned to the cooling element in the cooling unit. This subdivision can be specified using a mapping function. The mapping function can be manually or automatically determined. For example, a 1D array of the cooling elements in the Y-direction that move the build plate in the X-direction can specify a 2D grid of cooling zones. Alternative specifications are also possible.

A controller system takes the thermal data and maps to the build volume based on the projective mapping. Remapped thermal data to the build volume is analyzed. Thermal data is analyzed in each of the cooling zones. For example, mean, media, max, or top X % (e.g., top 10% percentile) of temperature data is computed in each cooling zone. These statistics data are compared to the desired/target temperature in each zone (e.g., an ambient temperature in the printer enclosure). If the temperature values are above the target values, the cooling element responsible for a given cooling zone is instructed to operate in order to cool the zone. The amount of the cooling (e.g., fan intensity, duration) can depend on how much the temperature values in the zone are above the target values.

It should be understood that the arrangement that is schematically illustrated in FIG. 1, is just one example. In another example, there may be two thermal management units 120, one on each side of the fabrication unit 110. This permits bidirectional printing with cooling as the object exits the fabrication unit. Another possible modification can relate to the relative position of the thermal sensor and the air distribution assembly. Rather than or in addition to thermally imaging the object before the object passes under the distribution assembly, one or more imaging sensors may be incorporated into the underside to the distribution assembly thereby providing thermal feedback during the cooling process. Although described in terms of using air for the cooling flow, other gasses may be used. For example, an enclosure surrounding the entire apparatus may contain an environment with an inert or otherwise non-reactive gas, which may provide a beneficial environment for curing of the materials. Nevertheless, "airflow" should be understood to be the flow of any gas used as an environment in the fabrication apparatus.

Control, feedback, and other operating procedures described above may be implemented in software, or in a combination of software and hardware. Software implementations may use instructions stored on non-transitory machine-readable media (e.g., non-volatile semiconductor memory). When these instructions are executed by a digital processor (e.g., controller, microprocessor, computer, etc.) the processor causes the system to perform the described procedures. Hardware components of the implementations may include application specific integrated circuits (ASICs), field programmable gate arrays (FPGAs) and the like.

Other embodiments and implementations of the described embodiments are within the scope of the appended claims.

What is claimed is:

1. An apparatus for additive manufacturing of an object, the apparatus comprising:
 a material deposition unit configured to incrementally add material to form a three-dimensional object in an additive manufacturing process;

a three-dimensional scanner for measuring dimensional properties of the object; and a thermal management unit comprising:

a controllable air distribution system configurable to direct airflow to cause change in the thermal properties of object during the additive manufacturing process;

a thermal measuring device comprising one or more thermal imaging devices for measuring thermal properties of the object, the measured thermal properties including a spatial thermal distribution of a surface of the object, the thermal measuring device being configured to measure thermal properties associated with the adding of the material to the object during the additive manufacturing process; and a controller, coupled to the controllable air distribution system, the thermal measuring device, and the three-dimensional scanner, the controller configured to:

receive measured thermal properties as input from the thermal measuring device, the measured thermal properties including a spatial thermal distribution of the three-dimensional object during the additive manufacturing process, receive dimensional properties of the object from the three-dimensional scanner, associate temperature with locations on the object based at least in part on the dimensional properties of the object and the spatial thermal distribution, determine inferred thermal properties including inferring an interior temperature of the object based at least in part on the dimensional properties of the object and the measured thermal properties, and provide a control signal to the controllable air distribution system as output for controlling the air distribution system according to a target thermal distribution of said object, the measured thermal properties, the association of temperature with locations on the object, and the inferred thermal properties.

2. The apparatus of claim 1, wherein the images produced by each of the thermal imaging devices in the thermal measuring device are combined to form a three-dimensional thermal image representation of the three-dimensional object.

3. The apparatus of claim 1, wherein the controllable air distribution system comprises a plurality of fans.

4. The apparatus of claim 3, wherein each fan in the plurality of fans is configured to blow substantially in the direction of the 3-dimensional fabricated object.

5. The apparatus of claim 4
wherein each fan in the plurality of fans is controllable by the controller to have a corresponding variable speed, at least some fans being controllable to have different variable speeds relative to one another.

6. The apparatus of claim 5, wherein each fan in the plurality of fans is positionally controllable such that different areas under the controllable air distribution system are cooled to different extents based on the thermal imaging.

7. The apparatus of claim 5, wherein the variable speed of each fan in the plurality of fans is controlled by the controller.

8. The apparatus of claim 1, wherein the controllable air distribution system comprises an air flow direction structure comprising a plurality of air flow direction channels.

9. The apparatus of claim 8, wherein at least one of the air flow direction channels in the air flow direction structure include an intake channel and an output channel.

10. The apparatus of claim 9, wherein the intake channel and the output channel are configured to cause airflow from the output channel into the intake channel in operation, and the output channel directs air toward the object.

* * * * *